US012670112B2

(12) United States Patent
Kim et al.

(10) Patent No.: US 12,670,112 B2
(45) Date of Patent: Jun. 30, 2026

(54) SEMICONDUCTOR APPARATUS AND SEMICONDUCTOR SYSTEM

(71) Applicant: SK hynix Inc., Gyeonggi-do (KR)

(72) Inventors: Hyo Keun Kim, Gyeonggi-do (KR); Min Su Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/829,297

(22) Filed: Sep. 10, 2024

(65) Prior Publication Data

US 2025/0363067 A1 Nov. 27, 2025

(30) Foreign Application Priority Data

May 27, 2024 (KR) ......................... 10-2024-0068363

(51) Int. Cl.
*G06F 13/36* (2006.01)
*G06N 20/00* (2019.01)

(52) U.S. Cl.
CPC .............. *G06F 13/36* (2013.01); *G06N 20/00* (2019.01); *G06F 2213/40* (2013.01)

(58) Field of Classification Search
None
See application file for complete search history.

(56) References Cited

U.S. PATENT DOCUMENTS

| | | | |
|---|---|---|---|
| 8,588,012 B2 * | 11/2013 | Wilson ................ | G06F 13/4234 |
| | | | 326/29 |
| 10,615,798 B2 * | 4/2020 | Gans .................. | H03K 19/0005 |
| 10,657,081 B2 * | 5/2020 | Schaefer ............. | G06F 13/1694 |
| 10,997,096 B2 | 5/2021 | Morris et al. | |
| 11,003,386 B2 * | 5/2021 | Stave ................... | G11C 7/1048 |
| 11,031,070 B1 * | 6/2021 | Buerkle ................. | G11C 8/06 |
| 11,831,674 B2 * | 11/2023 | Bangalore Sathyanarayana ......... |
| | | | H04L 63/1416 |
| 2008/0197877 A1 * | 8/2008 | Cox ..................... | G11C 7/1045 |
| | | | 326/38 |

FOREIGN PATENT DOCUMENTS

KR 10-2021-0057859 A 5/2021

* cited by examiner

*Primary Examiner* — Elias Mamo
(74) *Attorney, Agent, or Firm* — IP & T GROUP LLP

(57) ABSTRACT

A semiconductor system may include a semiconductor apparatus; a controller configured to control the semiconductor apparatus through a command address bus and a data bus, and a baseboard management controller configured to control the semiconductor apparatus through a management bus. The semiconductor apparatus includes a plurality of memories each configured to store data under the control of the controller, configured to output data stored in the semiconductor apparatus, and configured to perform an on-die termination (ODT) setting operation based on an identifier (ID) that is assigned by the baseboard management controller.

15 Claims, 3 Drawing Sheets

FIG. 2

SEMICONDUCTOR APPARATUS AND SEMICONDUCTOR SYSTEM

CROSS-REFERENCE TO RELATED APPLICATION

This application claims priority under 35 U.S.C. § 119(a) to Korean Patent Application No. 10-2024-0068363, filed on May 27, 2024, the entire contents of which are incorporated herein by reference.

BACKGROUND

1. Technical Field

Embodiments of the present disclosure relate to an integrated circuit technology and, more particularly, to a semiconductor apparatus and a semiconductor system.

2. Related Art

For a semiconductor apparatus to be mounted on a semiconductor system and to operate normally, a training operation needs to be completed.

The training operation may mean an operation of adjusting timing between signals between the semiconductor apparatus and a controller coupled to the semiconductor apparatus after the start of boot-up of the semiconductor system so that the signals between the semiconductor apparatus and the controller are transmitted and received normally.

Research for improving user satisfaction by reducing the time that is taken for the semiconductor system to perform a boot-up operation is in progress.

SUMMARY

In an embodiment of the present disclosure, a semiconductor system may include a semiconductor apparatus including a plurality of memories, a controller to control the semiconductor apparatus, a command address bus through which control signals that are used for the controller to control the semiconductor apparatus are transmitted and received, and a baseboard management controller configured to assign an identifier (ID) to each of the plurality of memories, in order to perform training operations that train the control signals.

In an embodiment of the present disclosure, a semiconductor system may include a semiconductor apparatus, a controller configured to control the semiconductor apparatus through a command address bus and a data bus, a baseboard management controller configured to control the semiconductor apparatus through a management bus. The semiconductor apparatus is configured to store data under the control of the controller, configured to output data stored in the semiconductor apparatus, and configured to perform an on-die termination (ODT) setting operation based on an identifier (ID) that is assigned by the baseboard management controller.

In an embodiment of the present disclosure, a semiconductor apparatus may include a plurality of memories, a buffer configured to transmit, to each of the plurality of memories, control signals for controlling the plurality of memories through a command address bus. Each of the plurality of memories is configured to receive an identifier (ID) that is assigned by a baseboard management controller through a management bus in order to train the control signals that are transmitted through the command address bus.

BRIEF DESCRIPTION OF THE DRAWINGS

FIG. 2 is a diagram illustrating a construction of a semiconductor apparatus according to an embodiment of the present disclosure.

DETAILED DESCRIPTION

Hereinafter, embodiments according to the technical spirit of the present disclosure are described with reference to the accompanying drawings.

Embodiments of the present disclosure provide a semiconductor apparatus and a semiconductor system that reduce the time taken for a boot-up operation.

It is possible to improve user satisfaction because the time taken for a boot-up operation can be reduced.

Figure 1:
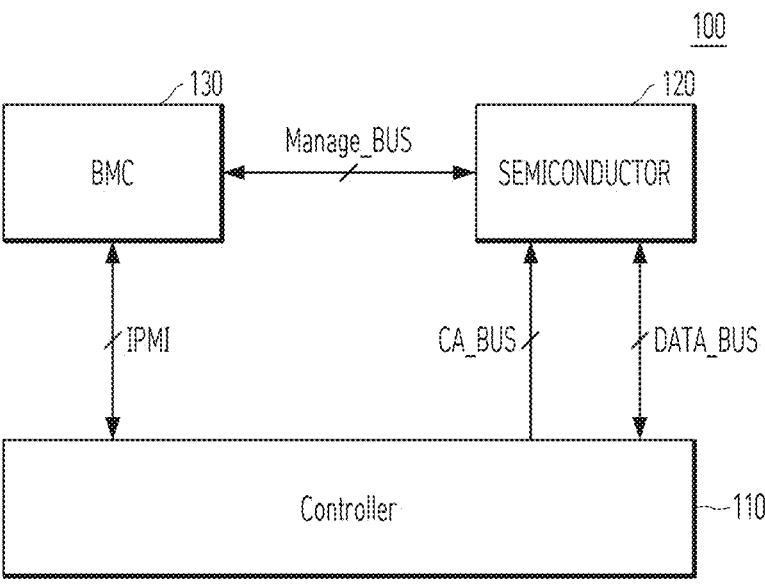
FIG. 1 is a diagram illustrating a construction of a semiconductor system according to an embodiment of the present disclosure.

FIG. 1 is a diagram illustrating a construction of a semiconductor system 100 according to an embodiment of the present disclosure.

Referring to FIG. 1, the semiconductor system 100 includes a controller 110, a semiconductor apparatus 120, and a baseboard management controller (BMC) 130. In some embodiments, the semiconductor apparatus 120 may include a memory module including a plurality of memory devices (e.g., a plurality of dynamic random access memories (DRAMs)).

The controller 110 controls an operation of the semiconductor apparatus 120. The controller 110 may be included in a processor, such as a central processing unit (CPU), a graphic processing unit (GPU), or an application processor (AP). The controller 110 transmits a command and an address to the semiconductor apparatus 120 through a command address bus CA_BUS, and transmits and receives data to and from the semiconductor apparatus 120 through a data bus DATA_BUS.

The semiconductor apparatus 120 performs a set operation under the control of the controller 110. For example, if the semiconductor apparatus 120 is a memory device, the semiconductor apparatus 120 may perform a read operation or a write operation under the control of the controller 110. The semiconductor apparatus 120 performs an operation that is indicated by the command and the address that are transmitted through the command address bus CA_BUS, transmits data to the controller 110 through the data bus DATA_BUS after the start of a read operation, and receives data that are transmitted through the data bus DATA_BUS after the start of a write operation. That is, the semiconductor apparatus 120 distinguishes between a read operation and a write operation based on a command and an address that are transmitted through the command address bus CA_BUS, transmits, to the controller 110, data stored in the semiconductor apparatus 120 through the data bus DATA_BUS after the start of a read operation, and stores data that are received through the data bus DATA_BUS after the start of a write operation.

The BMC 130 may include an apparatus that performs the management and monitoring function of a basic board of an apparatus, such as a server or a personal computer (PC). For example, the BMC 130 may communicate with the semiconductor apparatus 120, may manage circuits within the semiconductor apparatus 120, may also communicate with the controller 110, may check the state of the semiconductor system 100, and may manage the semiconductor system 100 or diagnoses a problem thereof. For example, if the semiconductor apparatus 120 is a memory module, the BMC 130 may manage memories (e.g., a plurality of DRAMs) within the semiconductor apparatus 120. An interface called an intelligent platform management interface (IPMI) may be basically used for communication between the BMC 130 and the controller 110.

Furthermore, communication between the BMC 130 and the semiconductor apparatus 120 may be performed through the management bus Manage_BUS. A memory module management control (M3C) interface similar to an inter-integrated circuit (I2C) interface may be used as the management bus Manage_BUS.

The command address bus CA_BUS and the data bus DATA_BUS between the controller 110 and the semiconductor apparatus 120 are buses that are used to perform a main function of the semiconductor apparatus 120, and thus such an interface is called an in-band interface. In this case, an external chip selection signal, an external clock, and data DQ are transmitted and received through the in-band interface. Specifically, the external chip selection signal CS_e and the external clock CLK_e are transmitted and received through the command address bus CA_BUS, and the data DQ are transmitted and received through the data bus DATA_BUS. Furthermore, the management bus Manage_BUS between the BMC 130 and the semiconductor apparatus 120 includes a bus that is used for additional control or management of the semiconductor apparatus 120, and thus such an interface is called a side-band interface. In this case, a management clock and a management control signal are transmitted and received through the side-band interface, that is, the management bus Manage_BUS.

The semiconductor system 100 constructed as above according to an embodiment of the present disclosure may perform the following boot-up operation.

When a boot-up operation is performed on the semiconductor system 100, each of the controller 110, the semiconductor apparatus 120, and the BMC 130 performs a boot-up operation according to a set sequence. For example, the controller 110 may perform an operation according to a boot-up sequence along with the semiconductor system 100, including the BMC 130 and the semiconductor apparatus 120, and external apparatuses. While the controller 110 performs the boot-up operation according to the boot-up sequence along with the external apparatuses, the BMC 130 performs the boot-up operation according to the boot-up sequence along with the semiconductor apparatus 120. At this time, the BMC 130 assigns an identifier (ID) to each of the plurality of memories included in the semiconductor apparatus 120. Furthermore, each of the plurality of memories included in the semiconductor apparatus 120 performs an on-die termination (ODT) setting operation based on the ID assigned thereto by the BMC 130.

In a common semiconductor system, after the start of a boot-up operation, a controller assigns an ID to each of memories of a semiconductor apparatus and performs an ODT setting operation. Compared to the common semiconductor system, in the semiconductor system 100 according to an embodiment of the present disclosure, the BMC 130 assigns an ID to each of the plurality of memories and each of the plurality of memories performs an ODT setting operation, while the controller 110 performs a boot-up operation along with another apparatus. Accordingly, the semiconductor system 100 according to an embodiment of the present disclosure has an advantage in that it can reduce the time that is taken for a boot-up operation to be completed compared to the common semiconductor system.

A construction and operation of the semiconductor apparatus that is included in the semiconductor system that operates as described above according to an embodiment of the present disclosure are described as follows with reference to FIGS. 2 and 3.

Figure 2:
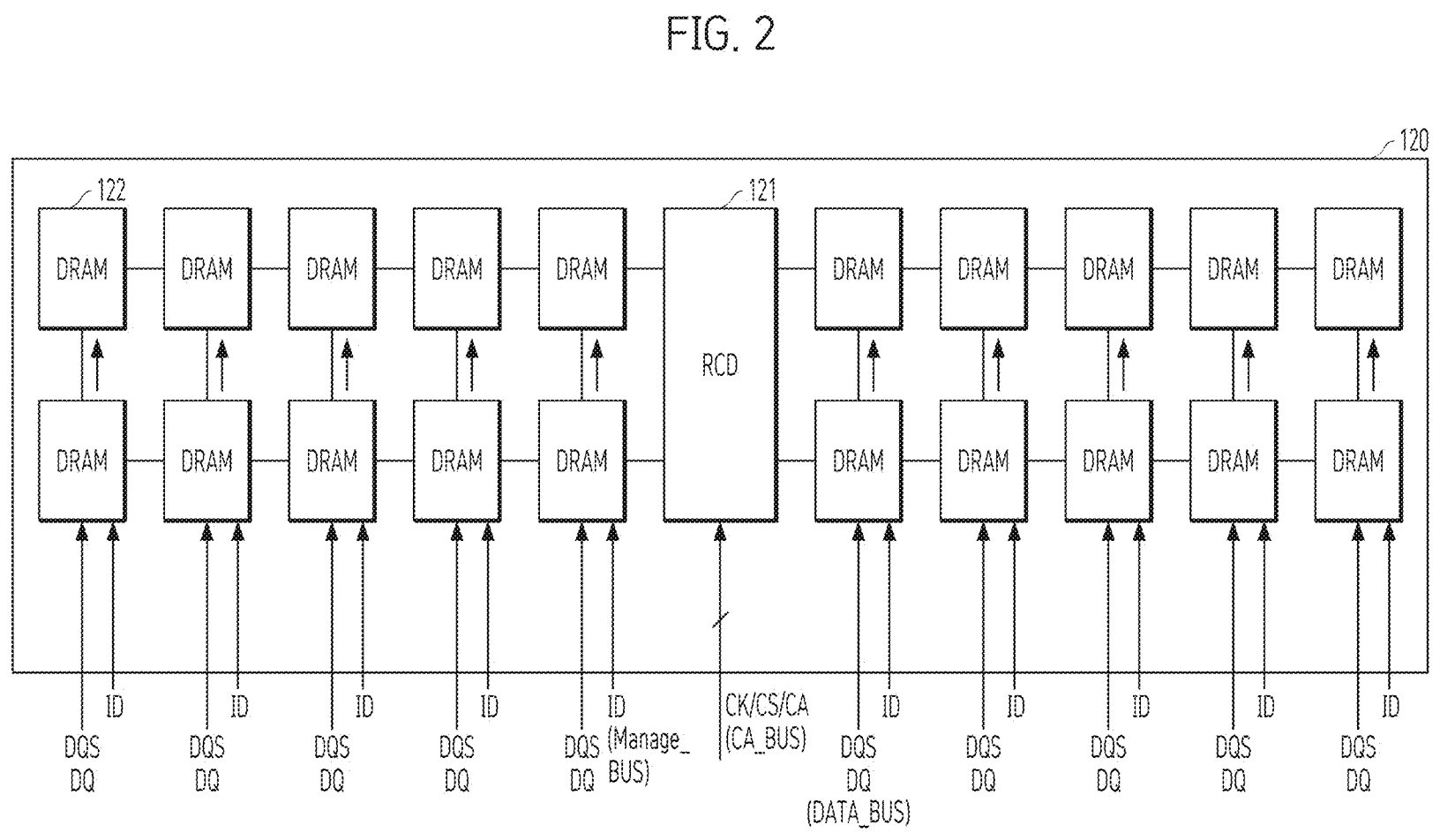

FIG. 2 is a diagram illustrating a construction of the semiconductor apparatus 120 according to an embodiment of the present disclosure. In an embodiment, the semiconductor apparatus 120 includes a memory module having a buffer (e.g., a registered clock driver (RCD)) 121 and a plurality of memories (e.g., DRAMs) 122.

Referring to FIG. 2, the semiconductor apparatus 120 includes the buffer 121 and the plurality of memories 122. In some embodiments, each of the plurality of memories 122 may include DRAM.

The buffer 121 receives, from the controller 110, control signals CK/CS/CA that control an operation of each of the plurality of memories 122 through the command address bus CA_BUS. The buffer 121 transmits the control signals CK/CS/CA that are received from the controller 110 to each of the plurality of memories 122. In some embodiments, the control signals CK/CS/CA that control each of the plurality of memories 122 include a clock CK, a chip selection signal CS, and a command address CA.

Each of the plurality of memories 122 transmits and receives the data DQ and a data strobe signal DQS to and from the controller 110 through the data bus DATA_BUS. Furthermore, each of the plurality of memories 122 transmits and receives the management clock SCL and the management control signal SCA to and from the BMC 130 through the management bus Manage_BUS. For example, each of the plurality of memories 122 may receive an identifier (ID) based on the management clock SCL and the management control signal SCA, which is assigned by the BMC 130, through the management bus Manage_BUS after the start of a boot-up operation. For example, the ID assigned to each of the plurality of memories 122 may correspond to a location relation between the buffer 121 and each of the plurality of memories 122. For example, the ID may be assigned to each of the plurality of memories 122 based on a distance between the buffer 121 and each of the plurality of memories 122. More specifically, for example, the plurality of memories 122 may be divided into a plurality of groups based on a distance range between the buffer 121 and the plurality of memories 122, and an ID according to a corresponding group is assigned to each of the plurality of memories 122. If the plurality of memories 122 is divided into two groups based on the distance range between the buffer 121 and the plurality of memories 122, the plurality of memories 122 may be divided into memories disposed at the outermost of the semiconductor apparatus 120 and other memories. That is, the two groups may be divided into memories having the longest distance between the buffer 121 and the plurality of memories 122 and other memories. Furthermore, the BMC 130 assigns IDs corresponding to corresponding groups to the plurality of memories 122 divided into the plurality of groups. The plurality of memories 122 to which the ID has been assigned performs an ODT setting operation based on the assigned ID. That is, the plurality of memories 122 may perform different ODT setting operations based on the assigned IDs.

Figure 3:
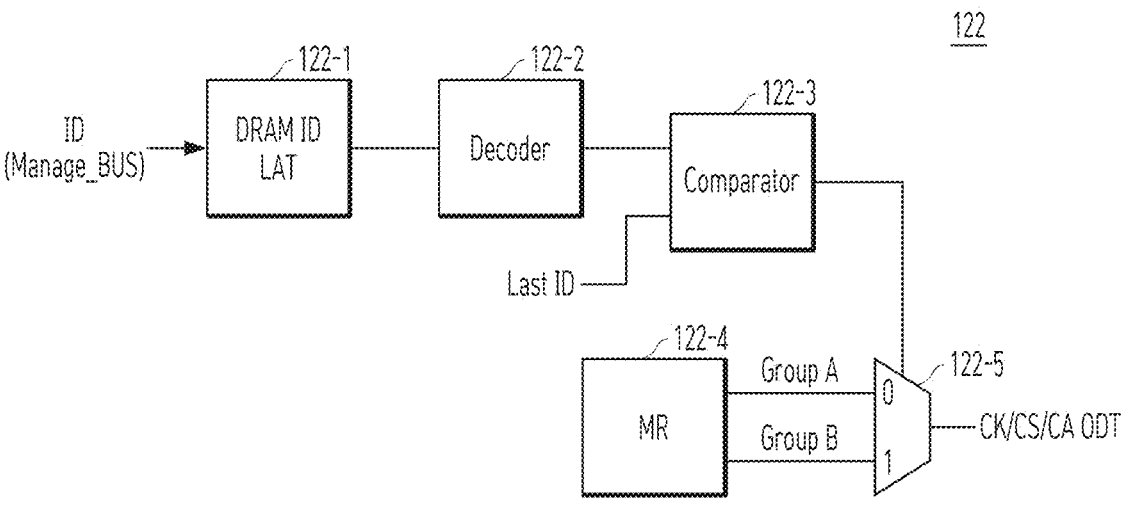
FIG. 3 is a diagram illustrating a construction of memory according to an embodiment of the present disclosure.

FIG. 3 is a diagram illustrating a construction of memory according to an embodiment of the present disclosure. In this case, a construction of the memory illustrated in FIG. 3 may be a construction of each of the plurality of memories illustrated in FIG. 2.

Referring to FIG. 3, in an embodiment, the memory 122 includes a latch circuit (DRAM ID LAT) 122-1, a decoder 122-2, a comparator 122-3, a mode register set (MR) 122-4, and a selector 122-5.

The latch circuit 122-1 stores a signal that is received from the BMC 130 through the management bus Manage-_BUS. For example, if the signal received through the management bus Manage_BUS includes the management clock SCL and the management control signal SCA, the latch circuit 122-1 may store the management control signal SCA based on the management clock SCL.

The decoder 122-2 generates an ID by decoding the management control signal SCA stored in the latch circuit 122-1.

That is, the latch circuit 122-1 and the decoder 122-2 generate an ID assigned to the memory 122, based on signals received from the BMC 130 through the management bus Manage_BUS.

The comparator 122-3 compares the ID received from the decoder 122-2, that is, the ID assigned by the BMC 130, and a preset ID Last ID. For example, the comparator 122-3 may compare whether the ID assigned by the BMC 130 and the preset ID Last ID are identical with each other. In some embodiments, the preset ID Last ID may include an ID that is assigned to the plurality of memories 122 disposed at the outermost of the semiconductor apparatus 120, as shown in FIG. 2. Furthermore, the preset ID Last ID may include an ID assigned to the plurality of memories 122 disposed at the longest distance from the buffer 121. If the plurality of memories 122 is divided into a plurality of groups based on a distance between the buffer 121 and the plurality of memories, the preset ID Last ID may include an ID corresponding to a corresponding group.

The mode register set 122-4 stores ODT setting values according to a location at which the plurality of memories 122 is disposed. For example, the mode register set 122-4 may store an ODT setting value according to a distance between the buffer 121 and the plurality of memories 122. More specifically, for example, the mode register set 122-4 may store ODT setting values that are divided into a plurality of groups based on a distance between the buffer 121 and the plurality of memories 122. In FIG. 3, the plurality of groups includes a first group Group A and a second group Group B, the first group Group A includes memories disposed at the longest distance from the buffer 121, and the second group Group B includes other memories, the mode register set 122-4 may store different ODT setting values corresponding to the first and second groups Group A and Group B.

The selector 122-5 selects one of ODT setting values stored in the mode register set 122-4, based on the results of a comparison of the comparator 122-3, and outputs the selected ODT setting value. For example, an ODT setting value CK/CS/CA ODT that is output by the selector 122-5 may be received by an ODT circuit (not illustrated) and used for an ODT setting operation of the ODT circuit. For example, the selector 122-5 may output, to the ODT circuit, one of an ODT setting value corresponding to the first group Group A and an ODT setting value corresponding to the second group Group B, based on the results of a comparison of the comparator 122-3.

As a result, the memory 122 constructed as above selects one of ODT setting values stored in the mode register set 122-4, based on the results of a comparison between the ID assigned by the BMC 130 and the preset ID Last ID, and performs an ODT setting operation based on the selected ODT setting value.

For example, when the plurality of memories 122 is divided into a first group Group A and a second group Group B based on a distance between each of the plurality of memories 122 and the buffer 121, the first group Group A is a group of memories disposed at the longest distance from the buffer 121, and the second group Group B is a group of the remaining memories. Furthermore, the ODT setting values corresponding to the first and second groups Group A and Group B, respectively, are stored in the mode register set 122-4. In some embodiments, a first ODT setting value corresponding to the first group Group A may be different from a second ODT setting value corresponding to the second group Group B.

After the start of a boot-up operation of the semiconductor system 100, the BMC 130 assigns an ID to each of the plurality of memories 122 through the management bus Manage_BUS.

Each of the plurality of memories 122 compares the ID assigned by the BMC 130 with the preset ID Last ID. In some embodiments, the preset ID Last ID may be an ID that is assigned to memories disposed at the longest distance from the buffer 121.

Each of the plurality of memories 122 may perform an ODT setting operation based on an ODT setting value corresponding to the first group Group A or perform an ODT setting operation based on an ODT setting value corresponding to the second group Group B, based on the results of the comparison between the assigned ID and the preset ID Last ID. For example, when the assigned ID is identical to the preset ID Last ID, each of the plurality of memories 122 may perform an ODT setting operation based on the ODT setting value corresponding to the first group Group A, among ODT setting values stored in the mode register set 122-4. In contrast, when the assigned ID is different from the preset ID Last ID, each of the plurality of memories 122 may perform an ODT setting operation based on the ODT setting value corresponding to the second group Group B, among the ODT setting values stored in the mode register set 122-4.

As a result, each of the plurality of memories 122 included in the semiconductor apparatus 120 may perform an ODT setting operation based on a different ODT setting value, based on an ID assigned by the BMC 130 through the management bus Manage_BUS, that is, a location at which each of the plurality of memories is disposed or a distance from the buffer 121.

The semiconductor system 100 according to an embodiment of the present disclosure can reduce the time that is taken for the semiconductor system 100 to perform a boot-up completion because the BMC 130 performs an ODT setting operation along with the plurality of memories 122 of the semiconductor apparatus 120, while the controller 110 performs a boot-up operation along with another apparatus, after the start of a boot-up operation.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure. Furthermore, the embodiments may be combined to form additional embodiments.

What is claimed is:

1. A semiconductor system comprising:
a semiconductor apparatus including a plurality of memories;
a controller to control the semiconductor apparatus;
a command address bus through which control signals that are used for the controller to control the semiconductor apparatus are transmitted and received; and
a baseboard management controller configured to assign an identifier (ID) to each of the plurality of memories, in order to perform training operations that train the control signals,
wherein the semiconductor apparatus further comprises a buffer configured to transmit, to each of the plurality of memories, the control signals that are received through the command address bus from the controller,
wherein the ID assigned by the baseboard management controller corresponds to a location at which each of the plurality of memories is disposed or a distance between each of the plurality of memories and the buffer.

2. The semiconductor system of claim 1, wherein each of the plurality of memories compares the assigned ID with a preset ID, and performs an on-die termination (ODT) setting operation based on results of the comparison between the assigned ID and the preset ID, among the training operations.

3. The semiconductor system of claim 2, wherein the preset ID comprises an ID that is assigned to memories disposed at an outermost of the semiconductor apparatus or an ID that is assigned to memories at a longest distance from the buffer.

4. The semiconductor system of claim 3, wherein each of the plurality of memories
stores a first ODT setting value and a second ODT setting value,
performs the ODT setting operation based on the first ODT setting value when it is determined that the assigned ID is the same as the preset ID, and
performs the ODT setting operation based on the second ODT setting value when it is determined that the assigned ID is different from the preset ID.

5. A semiconductor apparatus comprising:
a plurality of memories; and
a buffer configured to transmit, to each of the plurality of memories, control signals for controlling the plurality of memories, through a command address bus,
wherein each of the plurality of memories is configured to receive an identifier (ID) that is assigned by a baseboard management controller through a management bus in order to train the control signals that are transmitted through the command address bus,
wherein the ID assigned by the baseboard management controller corresponds to a location at which each of the plurality of memories is disposed or a distance between each of the plurality of memories and the buffer.

6. The semiconductor apparatus of claim 5, wherein each of the plurality of memories comprises:
a comparator configured to compare the assigned ID with a preset ID;

a mode register set configured to store a plurality of on-die termination (ODT) setting values; and
a selector configured to select one of the plurality of ODT setting values based on results of the comparison of the comparator.

7. The semiconductor apparatus of claim 6, wherein each of the plurality of memories performs an ODT setting operation based on the ODT setting value selected by the selector.

8. The semiconductor apparatus of claim 6, wherein the comparator compares whether the assigned ID is the same as the preset ID.

9. A semiconductor system comprising:
a semiconductor apparatus;
a controller configured to control the semiconductor apparatus through a command address bus and a data bus; and
a baseboard management controller configured to control the semiconductor apparatus through a management bus,
wherein the semiconductor apparatus is configured to store data under a control of the controller, configured to output data stored in the semiconductor apparatus, and configured to perform an on-die termination (ODT) setting operation based on an identifier (ID) that is assigned by the baseboard management controller.

10. The semiconductor system of claim 9, wherein the semiconductor apparatus comprises a plurality of memories, and a buffer configured to transmit, to each of the plurality of memories, control signals that are received through the command address bus from the controller.

11. The semiconductor system of claim 10, wherein the assigned ID corresponds to a location at which each of the plurality of memories is disposed or a distance between each of the plurality of memories and the buffer.

12. The semiconductor system of claim 11, wherein each of the plurality of memories compares the ID assigned by the baseboard management controller and a preset ID, and performs the ODT setting operation based on results of the comparison.

13. The semiconductor system of claim 12, wherein the preset ID comprises an ID that is assigned to memories disposed at an outermost of the semiconductor apparatus or an ID that is assigned to memories at a longest distance from the buffer.

14. The semiconductor system of claim 13, wherein each of the plurality of memories
stores an ODT setting value when it is determined that the assigned ID is the same as the preset ID and an ODT setting value when it is determined that the assigned ID is different from the preset ID, and
selects one of the stored ODT setting values based on the results of the comparison between the assigned ID and the preset ID and performs the ODT setting operation.

15. A semiconductor system comprising:
a semiconductor apparatus including a plurality of memories and a buffer;
a controller to control the semiconductor apparatus; and
a baseboard management controller configured to assign an identifier (ID) to each of the plurality of memories,
wherein the semiconductor apparatus is configured to perform an on-die termination (ODT) setting operation based on the assigned ID, and
wherein the assigned ID for each memory varies based on a distance between each memory and the buffer.

* * * * *